United States Patent Office 3,012,041
Patented Dec. 5, 1961

3,012,041
METHOD OF OBTAINING SUBSTANTIALLY PURE GLUCURONIC ACID LACTONE
Charles L. Mehltretter, Peoria, Ill., assignor to the United States of America as represented by the Secretary of Agriculture
No Drawing. Continuation of application Ser. No. 218,513, Mar. 30, 1951. This application July 22, 1959, Ser. No. 828,919
3 Claims. (Cl. 260—343.6)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention pertains to an improved and commercially advantageous method of obtaining crystalline cyclohexylidene - D - glucuronolactone, which compound has recognized utility as an intermediate in the preparation of glucuronolactone (Advances in Carbohydrate Chemistry, vol. 8, p. 238 (1953), Academic Press, Inc., N.Y.C.), which latter compound has known use as a growth factor and for other medicinal and pharmaceutical purposes (Rose et al., "The Condensed Chemical Dictionary," 5th ed. (1956), p. 524, Reinhold Publ. Co., N.Y.C.).

This application is a continuation of copending application, Serial No. 218,513, filed March 30, 1951, now abandoned.

The sodium salt of 1,2-cyclohexylidene-D-glucuronic acid was prepared by oxidizing the compound 1,2-cyclohexylidene-D-glucose with an oxygen containing gas such as oxygen or air in the presence of a platinum catalyst and sodium bicarbonate solution. The 1,2-cyclohexylidene-D-glucose is a known compound which may be prepared by reacting D-glucose with cyclohexanone: Kranzlein et al., U.S. Patent No. 1,902,866; Hockett et al., J.A.C.S., 71, 3072 (1949).

My invention depends on finding that the calcium salt of 1,2-cyclohexylidene-D-glucuronic acid is much less soluble in water than is the corresponding sodium salt as produced in the above-described reaction mixture. This finding has resulted in my discovering a commercially advantageous means of obtaining the substantially pure glucuronic acid in the form of its lactone by converting the more soluble sodium salt of 1,2-cyclohexylidene-D-glucuronic acid in the reaction mixture to the less soluble calcium salt, separating the said calcium salt, reacting the separated salt with sulfuric acid to form and precipitate calcium sulfate, and separating the solution containing 1,2-cyclohexylidene-D-glucuronolactone. The product upon heating in water solution is hydrolyzed to liberate cyclohexanone and glucuronic acid, the latter of which crystallizes out in essentially free form as its lactone, glucuronolactone, upon concentrating the solution.

The following specific example illustrates the invention. Parts are by weight unless otherwise specified.

*Example 1*

Seven parts of 1,2-cyclohexylidene-D-glucose dissolved in 300 parts of water were mixed with 2.3 parts of sodium bicarbonate. The mixture was heated to 55° C. and 10 parts of platinum-activated carbon catalyst containing 13 percent platinum were introduced. The mixture was stirred and a stream of air was passed through for 75 minutes, during which time the pH dropped to 7.4. The reaction was then stopped. The catalyst was removed by filtration and washed with hot dilute sodium chloride solution.

The combined filtrate and washings were concentrated at reduced pressure until crystals of the sodium salt of 1,2-cyclohexylidene-D-glucuronic acid began to separate. The calcium salt was then prepared from a concentrated solution of the sodium salt by adding 200 parts of hot water followed by 2.5 parts of calcium chloride dissolved in 20 parts of water. The calcium salt of 1,2-cyclohexylidene-D-glucuronic acid crystallized from the solution and was separated by filtration and dried. It was purified by recrystallization from water. The purified and dried product weighed 3.2 parts. It had the following analysis:

(Loss of water on drying at 110° C./1 mm. for 1 hr.: 4.0%)

Found: Ca, 6.8%; C, 48.9%; H, 5.8%. Calc'd for $Ca(C_{12}H_{17}O_7)_2$: Ca, 6.8%; C, 49.1%; H, 5.8%.

A second crop of 1.4 parts of the pure calcium salt of 1,2-cyclohexylidene-D-glucuronic acid was obtained by concentrating the mother liquor.

The free 1,2-cyclohexylidene glucuronic acid may be obtained as its lactone from the salts by means of a reagent for removing the salt cation, as shown in Example 2.

The specific test for glucuronic acid (Tollens, Ber. 41, 1788 (1908), using the naphtho-resorcinol reaction was positive for both crops of product.

*Example 2*

Ten and six-tenths grams of the calcium salt of 1,2-cyclohexylidene-D-glucuronic acid were added in portions to 356 ml. of 0.106 N sulfuric acid, an equivalent amount, with stirring. After 15 minutes the precipitated calcium sulfate was removed by filtration, and the remaining solution was evaporated to dryness in vacuo.

The residue was extracted with hot absolute methanol and the filtered extract cooled to precipitate and to separate crystalline 1,2 - cyclohexylidene - D - glucuronolactone. The product, upon recrystallization from methanol, melted at 140°–150° C. and weighed 5.1 g.

*Analysis.*—Calc'd for $C_{12}H_{16}O_6$: C, 56.2; H, 6.3. Found: C, 56.6; H, 6.3.

Having thus disclosed my invention, what I claim is:
1. A method comprising forming a sodium salt of 1,2-cyclohexylidene-glucuronic acid by heating 1,2-cyclohexylidene-D-glucose dissolved in a weak aqueous solution of sodium bicarbonate in the presence of a platinum-activated carbon catalyst and an oxygen containing gas, separating the catalyst, concentrating the remaining solution to the point where crystallization begins, adding enough hot water to redissolve any crystals formed and still give a concentrated solution, adding at least an equivalent of hot aqueous calcium chloride solution to form the relatively poorly soluble calcium salt of 1,2-cyclohexylidene-D-glucuronic acid, precipitating the calcium salt, and separating the precipitated salt.

2. The method of claim 1 in which the separated calcium salt of 1,2-cyclohexylidene-D-glucuronic acid is reacted with an equivalent amount of sulfuric acid to free the 1,2-cyclohexylidene-D-glucuronic acid and to precipitate calcium sulfate, the precipitated calcium sulfate is filtered off, the filtrate is evaporated to dryness, the dry residue is extracted with hot methanol, the methanol extract is cooled to precipitate crystalline 1,2-cyclohexylidene-D-glucuronolactone, and the precipitated product is separated.

3. The method of claim 2 in which the 1,2-cyclohexylidene-D-glucuronolactone is heated in water solution to hydrolize it and liberate cyclohexanone and glucuronolactone and the solution is concentrated to crystallize out the glucuronolactone.

References Cited in the file of this patent

UNITED STATES PATENTS 2,627,520    Benjamin et al. _____ Feb. 3, 1953
2,845,439    Reiners _____ July 29, 1958